United States Patent [19]
Faltermeier et al.

[11] Patent Number: 5,712,725
[45] Date of Patent: Jan. 27, 1998

[54] ONE-HAND CONTROL UNIT FOR CONTROLLING MOVEMENTS

[75] Inventors: Bernd Faltermeier, Aalen; Franz Ferninand von Falkenhausen, Jena, both of Germany

[73] Assignee: Carl-Zeiss-Stiftung, Brenz, Germany

[21] Appl. No.: 587,847

[22] Filed: Jan. 11, 1996

[30] Foreign Application Priority Data

Jan. 11, 1995 [DE] Germany ............ 195 00 530.9

[51] Int. Cl.⁶ .................. G02B 7/08; G02B 21/00; G02B 21/06; G08G 9/047
[52] U.S. Cl. .......... 359/392; 359/381; 359/388; 359/393; 359/368; 345/164; 345/165
[58] Field of Search ............ 359/379, 380, 359/381, 388, 393, 368, 392; 345/164, 165

[56] References Cited

U.S. PATENT DOCUMENTS

| | | |
|---|---|---|
| 4,624,537 | 11/1986 | Hanssen et al. |
| 5,095,302 | 3/1992 | McLean et al. |
| 5,095,303 | 3/1992 | Clark et al. |
| 5,252,970 | 10/1993 | Baronowsky ............ 345/164 |

FOREIGN PATENT DOCUMENTS

| | | | |
|---|---|---|---|
| 0577084 | 1/1994 | European Pat. Off. | |
| 60-258813 | 12/1985 | Japan | 359/368 |
| 61-27019 | 12/1986 | Japan | 359/368 |
| 6-250097 | 9/1994 | Japan | 359/368 |

OTHER PUBLICATIONS

Brochure "Planicomp P3", 51-725-e (W-TS-III/87 Too) (1987)(no month).

*Primary Examiner*—Jon W. Henry
*Attorney, Agent, or Firm*—Walter Ottesen

[57] ABSTRACT

The invention relates to a one-hand control unit for controlling movements in optical instruments. The control unit corresponds in its configuration essentially to a computer mouse and has a mouse roller ball 2 on its lower side, an additional rotational transducer 3 at the thumb position and two or three keys (5, 6, 7) on the side of the mouse lying opposite to the rotational transducer 3. The keys (5, 6, 7) are for actuation by the middle finger, index finger and little finger, respectively. The mouse roller ball 2 and the rotational transducer 3 preferably function to drive continuously movable elements such as the illuminating field diaphragm 13, the aperture diaphragm 12, the motorized focus 20 or a motorized object stage 21. The keys (4, 5, 6, 7) are provided for driving discretely adjustable elements such as the objective-lens turret 14 or the incident-light reflector turret 15 or for switching over between coarse drive and fine drive for a motor-driven focus drive.

26 Claims, 3 Drawing Sheets

ONE-HAND CONTROL UNIT FOR CONTROLLING MOVEMENTS

FIELD OF THE INVENTION

The invention relates to a one-hand control unit for controlling movements preferably in optical instruments. A one-hand control unit of this kind is known conventionally as a mouse because of its shape. These control units have an element on their lower side which detects a two-dimensional movement of the control unit on a support surface. In addition, such control units include two or three momentary-contact switches or keys on the upper side thereof. With such a mouse, it is possible only to provide a two-dimensional movement of a single moved element such as a computer cursor on a monitor.

BACKGROUND OF THE INVENTION

U.S. Pat. No. 5,095,302 discloses that a further transducer is provided in order to obtain an apparent depth movement of a computer image by means of a mouse in a three-dimensional image presentation on a computer monitor. For this purpose, the upper side of the mouse has an opening in which the thumb or the index finger of the operator can be introduced and the depth of the thumb or the index finger is detected by corresponding sensors.

For the third direction of movement, U.S. Pat. No. 5,095,303 discloses mounting a belt drive on the upper side of the mouse which can be operated by the index finger. In addition, further rotational transducers are provided on the upper side of the mouse and on one of the sides of the mouse. With the aid of these rotational transducers, rotational movements of the computer image about different rotational axes can be triggered.

A publication of Carl Zeiss having the publication number 51-725-e (W-TS-III/87 Noo) and entitled "P3 Planicomp" discloses an analytical plotter. The analytical plotter includes a mouse-like control unit for the movements of the image carriage. The control unit includes a mouse roller ball for detecting the movements of the control unit on the supporting surface. The mouse roller ball drives the X-Y movement and an additional rotational transducer on the forward end of the control unit drives the Z-movement of the image carriage. Furthermore, several keys are provided above the rotational transducer on the upper side of the control unit for triggering rapid movements of the image carriage and for calling up preset functions.

The known mouse-like control units have not received broad acceptance for controlling movements on microscopes. The reason for this is apparently that the known one-hand control units have either too few keys for the various discrete switching functions required for a microscope or, although an adequate number of keys is provided as shown in the control unit for the "P3 Planicomp", they are however more or less arranged as a key array which does not satisfy the requirements imposed on a microscope with respect to ergonomics. The known one-hand control units which are inadequate for this purpose are disclosed in the two above-mentioned United States patents.

Up to now, microscope controls were carried out by means of a computer mouse in that the above-mentioned simple systems were used and the particular function was selected by means of a cursor on the computer monitor. In systems which are convenient, the computer monitor is reflected into the microscope tube. However, this detracts from a simultaneous viewing of the effect of the manipulation.

As an alternative to the above, European patent publication 0,577,084 discloses that the movement of a micromanipulator can be driven directly by means of such a mouse. A three-dimensional movement is however required and the mouse is adapted only for controlling a two-dimensional movement. For this reason, a switchover by means of one of the keys between the orthogonal planes is required in which the movement corresponding to the movement of the mouse roller ball takes place. However, incorrect movements of the micromanipulator can easily occur because the plane of movement must be changed often and the adjusted movement plane is not directly recognizable.

SUMMARY OF THE INVENTION

It is an object of the invention to provide a one-hand control unit for controlling movements with which different continuous movements as well as also discrete switching operations can be carried out in a reliable manner. It is a further object of the invention to provide such a one-hand control unit which satisfies the ergonomic requirements imposed on a microscope during routine use thereof.

The one-hand control unit of the invention is placed on and moved over a support surface to control movements in instruments such as optical instruments. The one-hand control unit includes: a body which can be manually grasped by an operator; the body having a lower side for placing said control unit on the support surface and for guiding the control unit thereover; the body having two lateral sides lying opposite each other; a rotational transducer mounted in one of the lateral sides for detecting one or two dimensional movement; and, at least one momentary-contact switch mounted in the other one of the lateral sides.

The control unit according to the invention has a side which is essentially perpendicular to the lower side and includes a rotational transducer in this one side which detects one-dimensional or two-dimensional rotational movements. On the opposite side, the control unit includes one or several keys and preferably two or three keys. The element on the lower side of the control unit detects the two-dimensional movement of the control unit on the support surface. Together with this one element, several continuous movements can be driven and discrete movements can be driven by the keys. The rotational transducer and the keys are so arranged that with the hand placed upon the control unit, the rotational transducer can be provided in a position corresponding to the position of the thumb and the two keys are mounted to correspond to the positions of the middle finger and the ring finger or the three keys are mounted to correspond to the middle finger, ring finger and little finger. A further key can be provided for the index finger on the forward end of the control unit.

For a control unit set down on a control surface, the keys should be arranged at different elevations measured from the support surface on the appropriate side. Thus, the key for the little finger should be closer to the support surface than the keys for the middle finger and the ring finger. In this way, the corresponding positions of the finger tips are correct when the ball of the hand is placed on the support surface. In total, a sensitive guidance of the control unit on the support surface as well as excellent reachability of the individual keys is ensured.

A preferred area of use of the control unit of the invention is for the control of motor-moved elements in a microscope. The keys are provided for controlling discretely movable elements such as objective-lens turrets or incident-light reflector turrets or reflector slides. For such elements switchable in discrete steps, one key should be provided for triggering a counter-clockwise rotation or left displacement and a further key should be provided for triggering a clockwise or right displacement. The correspondence of these two keys to the objective-lens turret or, alternatively, to the reflector turret or reflector slide can be selected by means of a third key.

The rotational transducer and the mouse roller ball for detecting the movement of the control unit are then provided for controlling continuously movable elements such as illuminating field diaphragms or aperture diaphragms. If the microscope has a motorized focus drive, then the rotational transducer can also function to control this focus drive. In this case, it is especially advantageous when the gear reduction of the motor focus can be varied by means of a key.

A further area of application of the control unit of the invention is in microscopes which are, in addition, equipped with a computer and a computer monitor. The association of the movement of the mouse roller ball between the continuously movable element of the microscope and the movement of the mouse cursor on the computer monitor can be switched by means of one of the keys. Accordingly, only a single control unit is required for the movement of the cursor and for the control of the microscope so that an additional movement of the operator is avoided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
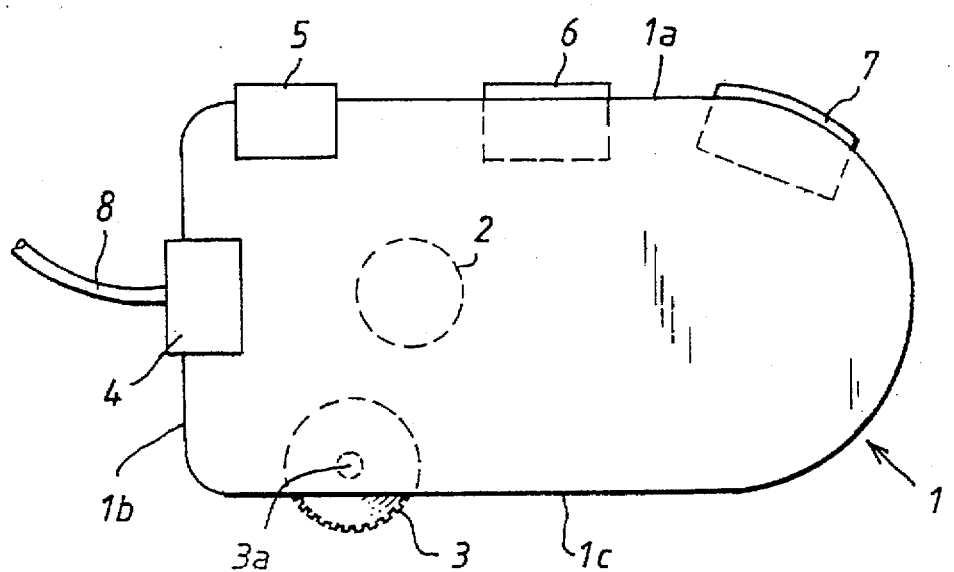
FIG. 1A is a plan view of a one-hand control unit according to the invention.
Figure 1B:
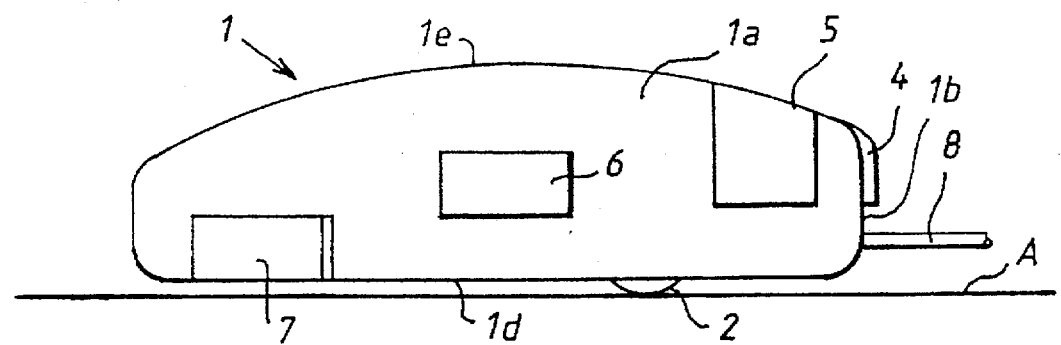
FIG. 1B is a side elevation view of the control unit of FIG. 1A.
Figure 1C:
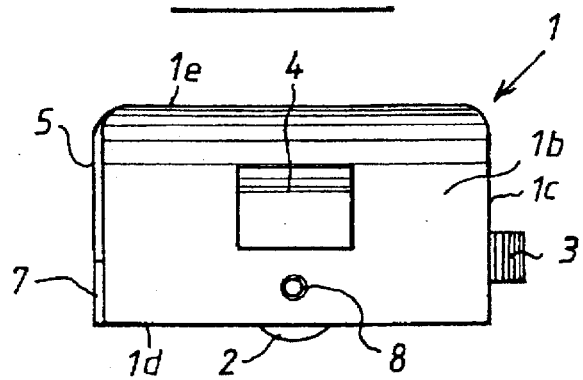
FIG. 1C is a front view of the control unit of FIG. 1A.

The control unit 1 shown in FIGS. 1A to 1C includes the following: a lower side 1d for placing the control unit 1 on a support surface A; a front end 1b standing substantially perpendicular to the lower side 1d; two longitudinal sides (1a, 1c) which extend substantially perpendicular to both the lower surface 1d and to the front surface 1b; and, an upper side 1e. The upper side 1e is configured so as to be rounded so that the entire control unit can be comfortably held by an operator with one hand and can be guided over the support surface A.

On the lower side 1d, the mouse roller ball 2 is arranged in a manner known per se and detects a two-dimensional movement of the entire control unit 1 relative to the support surface A. The movement of the mouse roller ball 2 about two mutually perpendicular rotational axes is detected by means known per se and not shown in the drawings. An electric pulse train is generated in correspondence to the rotational movement. The generation of corresponding electrical signals is disclosed, for example, in U.S. Pat. No. 5,095,303 incorporated herein by reference.

The connecting cable 8 is provided at the front end 1b and connects the control unit 1 to the optical apparatus to be driven and conducts away the electrical signals generated within the control unit. In lieu of this connecting cable, an IR or ultrasonic transmitter can be used when the signal transmission is to be wireless for a free movement of the control unit.

Usually, such a control unit is grasped manually at the rounded side thereof lying opposite to the cable 8 and guided on the support surface A. The thumb is usually on the side 1c. A rotational transducer 3 is mounted at the thumb position and has a drive wheel which projects outwardly beyond the side surface 1c and can therefore be actuated by the thumb. This rotational transducer 3 also generates a pulse train proportional to the rotational angle in a manner known per se when rotated about its rotational axis 3a. The rotational axis 3a of the rotational transducer 3 can be perpendicular to the lower side 1d as shown in FIG. 1A or the rotational axis 3a can lie in a plane parallel to the lower side 1d.

Three momentary-contact switches or keys (5, 6, 7) are distributed over the surface of side 1a lying opposite to the rotational transducer 3. The keys (5, 6, 7) are positioned so that a first key 5 corresponds to the position of the middle finger and a second key 6 corresponds to the position of the ring finger and a third key 7 corresponds to the position of the little finger. For this purpose, the keys (5, 6, 7) are at different distances with respect to the lower side 1d.

The key 7 for the little finger is arranged directly above the base surface 1d and the key 6 for the ring finger and key 5 for the middle finger are spaced at increasing distances from the base surface in the above-mentioned sequence. A further key 4 is provided above the cable 8 on the forward end 1b. This key 4 extends on the upper side 1e of the control unit and is provided to be operated with the index finger.

When actuated, the keys (4 to 7) each generate an electrical pulse which is likewise conducted away from the control unit via the cable 8. The keys (4 to 7) are configured in a manner known per se.

The control unit for right-handed operation is shown in FIGS. 1A to 1C. For a left-handed operation, the keys (5, 6, 7) and the rotational transducer 3 need only be reversed.

Figure 2:
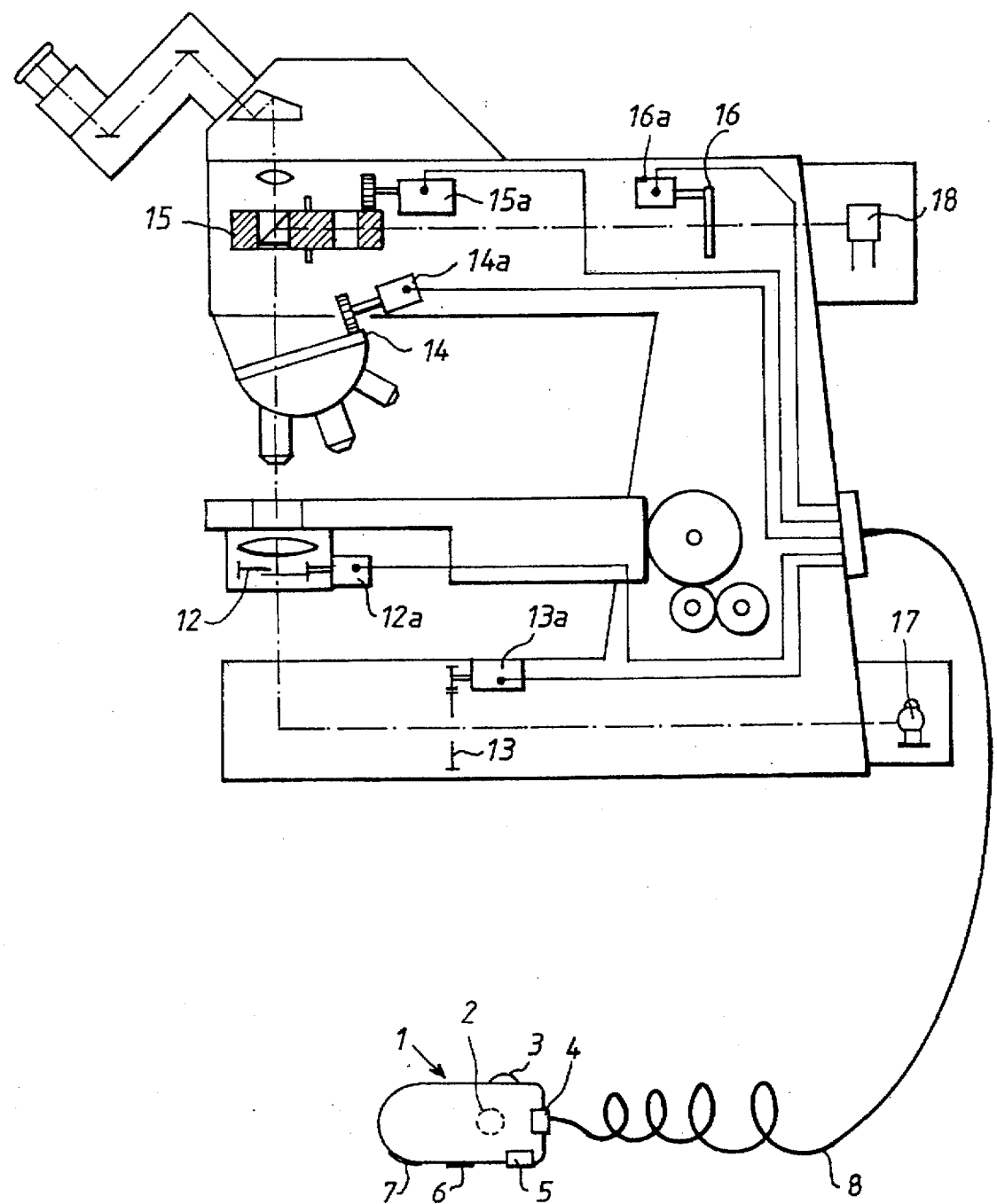
FIG. 2 is a schematic of a microscope equipped with the control unit shown in FIG. 1A; and, FIG. 3 is a schematic of an alternate microscope equipped with the control unit of FIG. 1A.

The microscope shown in FIG. 2 has the following continuously movable elements: an aperture diaphragm 12 and an illuminating field diaphragm 13 in the transilluminating beam path of the substage illumination 17. The aperture diameter of the aperture diaphragm 12 and of the illuminating field diaphragm 13 can be varied by drive motors (12a, 13a) assigned thereto. The drive motor 12a of the aperture diaphragm 12 is driven in correspondence to the pulse train generated by the mouse roller ball 2 and the aperture diameter of the diaphragm 12 is correspondingly varied. The setting of the illuminating field diaphragm 13 takes place via the lateral rotational transducer 3 in that the drive motor 13a, which corresponds to the illuminating field diaphragm, is correspondingly driven by the pulse train generated by the rotational transducer 3.

In the upper part, the microscope in FIG. 2 includes a motor-driven objective-lens turret 14 having a drive motor 14a corresponding thereto and an incident-light reflector turret 15 having drive motor 15a. Furthermore, a shutter 16, which is driven by a further motor 16a, is arranged in the beam path of the incident illumination 18. This shutter 16 functions to interrupt the incident light beam path when observing in transilluminated light. In this way, the incident illumination 18 can remain switched on even during viewing in transilluminated light. This is advantageous for the service life of the discharge lamp which often defines the source of incident illumination.

The objective-lens turret 14 and the incident-light reflector turret 15 each have five, six or even seven different discrete switching positions. Of the switching positions of the incident-light reflector turret 15, only two are shown in FIG. 2. The first position shown is where the 50% divider plate or splitter prism is switched into the beam path for conventional incident light microscopy and the second position shown is for the conventional transmitted-light microscopy in which case an unequipped switching position of the incident-light reflector turret 15 is switched into the beam path. For fluorescent observation, the incident-light reflector turret 15 is equipped with additional dichroic beam splitters in the respective switching positions (not shown) lying above and below the plane of the paper.

Driving the motor 14a of the objective-lens turret 14 takes place via the keys (4, 5) of the control unit 1 which are provided for the index finger and the middle finger, respectively. An actuation of the first key 4 effects a counterclockwise rotation of the objective-lens turret 14 by one turret position and an actuation of the second key 5 effects a clockwise rotation of the objective-lens turret 14 by one turret position. Correspondingly, and for a simultaneous actuation of the third key 7 with one of the two first-mentioned keys 4 or 5, a clockwise or counter-clockwise rotation of the incident-light reflector turret 14 by one switching position is generated. The drive of either the drive motor 14a for the objective-lens turret 14 or of the drive motor 15a for the incident-light reflector turret 15 by the two first-mentioned keys 4 and 5 can be varied in this way by the third key 7.

The shutter motor 16a can be driven by means of the key 6 of the control unit 1. The key 6 is provided for the ring finger. The shutter motor 16a has only two discrete switching positions, namely with the shutter diaphragm 16 switched into the beam path and with the shutter diaphragm 16 switched out of the beam path. For each actuation of the corresponding key 6, a switching of the shutter diaphragm 16 takes place so that, for several actuations, the diaphragm 16 is alternatingly switched out of the beam path and into the beam path. The switch (not shown) of the substage illumination 17 is coupled to the movement of the shutter diaphragm in such a manner that the substage illumination 17 is automatically switched on when the shutter diaphragm 16 is pivoted into the beam path and switched off when the shutter diaphragm is switched out of the beam path.

Only relatively few elements are motor driven in the microscope of FIG. 2. Thus, this microscope has no motor-driven focus. However, not all control possibilities of the control unit 1 are utilized here. Although the mouse roller ball 2 is configured to generate two independent signal sequences in dependence upon whether the control unit is moved forward and to the rear or toward the left and right, only a one-dimensional movement is controlled with the aid of the mouse roller ball 2, namely, opening and closing the aperture diaphragm 12.

In an alternate embodiment, wherein the microscope has, in addition, a motor-driven focus drive, the aperture diaphragm 12 as well as the illuminating field diaphragm can be driven via the mouse roller ball 2. The pulse train, which is generated by a lateral movement of the control unit 1, leads to an opening or closing of the aperture diaphragm 12 and the pulse train, which is generated by a forward and rearward movement of the control unit 1, leads to an opening or closing of the field diaphragm 13. The function of the lateral rotational transducer 3 is free and can be used for actuating the motor focus.

Figure 3:
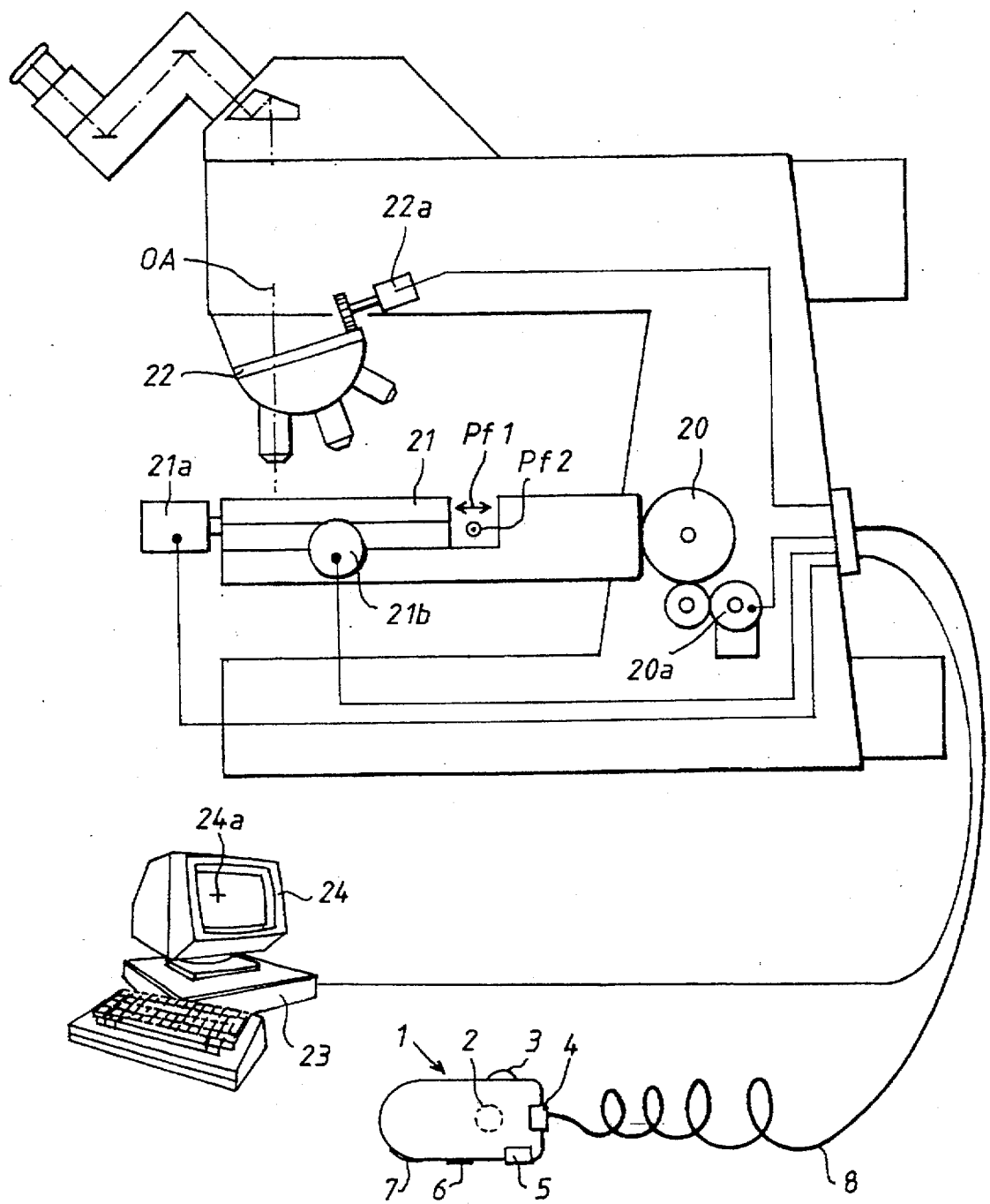

The microscope in FIG. 3 includes a motor-driven object stage 21 with two motors (21a, 21b) corresponding thereto. The motor 21a effects a movement of the object stage 21 in the plane of the drawing in the direction of arrow Pf1 and the motor 21b effects a movement of the object stage perpendicularly to the plane of the drawing in the direction of arrow Pf2. The microscope also includes a motor-driven focus drive 20 with a focus motor 20a which moves the object stage 21 in the direction of the optical axis OA.

The two motors (21a, 21b) generate the movements of the object stage 21 perpendicularly to the optical axis OA. In this embodiment, the two motors (21a, 21b) are driven in correspondence to the movement of the mouse roller ball 2, that is, a lateral movement of the control unit 1 leads to a corresponding rotational movement of the drive motor 21b and a corresponding displacement of the object perpendicularly to the plane of the paper in the direction of arrow Pf2 and a forward and rearward movement of the control unit 1 leads to a movement of the drive motor 21a, which is in accord with the pulse train corresponding thereto, and a corresponding movement in the plane of the drawing in the direction of arrow Pf1. The focus motor 20b is driven via the lateral rotational transducer 3.

The actuation of the keys (4, 5) for the index finger and the middle finger, respectively, leads to a switching of the motor-driven objective-lens turret 22 by means of the corresponding drive motor 22a by one switching position toward the right or left. This is the same as in the embodiment of FIG. 2. However, and different from the embodiment of FIG. 2, the keys 6 and 7 for the ring finger and for the little finger are occupied. Here, the reduction ratio of the drive motor 20a for the focus drive 20 can be varied by means of the key 6 for the ring finger. An actuation of the key 6 effects a switchover between coarse drive and fine drive. For this purpose, a circuit (not shown) is provided in the microscope by means of which each pulse generated by the rotational transducer 3 in the coarse-drive mode is multiplied by a fixed factor of approximately 100 so that, for a rotation of the rotational transducer 3, the object stage 21 is displaced by a distance greater by a factor of 100 in the direction of the optical axis than for the same rotation of the rotational transducer 3 in the fine-drive mode.

The key 7 for the little finger functions here for switching over the drive from the microscope to the computer 23 connected to the microscope. After actuating the key 7, the cursor 24a on the computer monitor 24 is moved in correspondence to the movement of the mouse roller ball 2 in lieu of the drive motors (21a and 21b) of the object stage 21. The function to which the cursor 24a is moved on the monitor 24 is selected by means of the key 4. In this mode, the adjustments of the object stage 21 and of the objective-lens turret 22 are blocked and can be driven by the control unit 1 only after actuating the key 7 again. The functions of the rotational transducer 3 and the key 6 which control the focus drive are not affected by the switchover between the microscope mode and the computer mode; that is, even when driving the computer cursor 24a via the mouse roller ball 2, a focussing movement by means of the rotational transducer 3 and a switchover between the coarse drive and the fine drive by means of the key 6 are still possible.

If continuous movements with a total of four mutually independent degrees of movement are to be driven, then the rotational transducer 3 is replaced by a ball (corresponding to a track ball) which is rotatable in two directions perpendicular to each other in the embodiments shown.

Furthermore, the continuous movements of the microscope elements must not perforce be proportional to the signal sequences of the rotational transducer 3 or the mouse roller ball 2. Rather, it is also possible and for large displacement paths also advantageous, to generate velocity-dependent pulse trains from the primarily generated pulse trains in correspondence to U.S. Pat. No. 4,624,537 which shows appropriate circuits and is incorporated herein by reference. The drive motors are then correspondingly driven.

It is understood that the foregoing description is that of the preferred embodiments of the invention and that various changes and modifications may be made thereto without departing from the spirit and scope of the invention as defined in the appended claims.

What is claimed is:

1. A one-hand control unit which is placed on and moved over a support surface to control movements in instruments, the one-hand control unit comprising:

a body which can be manually grasped by an operator;

said body having a lower side for placing said control unit, on the support surface and for guiding said control unit thereover;

said body having two lateral sides lying opposite each other;

a rotational transducer mounted in one of said lateral sides for detecting one or two dimensional movement;

at least two momentary-contact switches mounted on said other one of said lateral sides;

said rotational transducer being located on said one lateral side so as to correspond to the position of the thumb of said operator;

said two momentary-contact switches being located on said other lateral side so as to correspond to the respective positions of the middle finger and the ring finger; and, a third momentary-contact switch mounted on said other one of said lateral sides and located thereon to correspond to the position of the little finger.

2. The one-hand control unit of claim 1, further comprising an element mounted in said lower side for detecting a two-dimensional movement of said control unit on said support surface.

3. The one-hand control unit of claim 1, said body having a forward side lying essentially perpendicular to said first and second lateral sides; and, said control unit further comprising an additional momentary-contact switch mounted on said forward side.

4. A one-hand control unit which is placed on and moved over a support surface to control movements in instruments, the one-hand control unit comprising:

a body which can be manually grasped by an operator;

said body having a lower side for placing said control unit on the support surface and for guiding said control unit thereover;

said body having two lateral sides lying opposite each other;

a rotational transducer mounted in one of said lateral sides for detecting one or two dimensional movement;

a plurality of momentary-contact switches; and, at least three of said momentary-contact switches being mounted on said other one of said lateral sides with said three switches being at respectively different elevations measured from said support surface when said control unit is placed thereon.

5. The one-hand control unit of claim 4, further comprising an element mounted in said lower side for detecting a two-dimensional movement of said control unit on said support surface.

6. The one-hand control unit of claim 4, wherein at least two of said momentary-contact switches are mounted on said other one of said lateral sides; and, wherein said rotational transducer is located on said one lateral side so as to correspond to the position of the thumb of said operator; and, said two momentary-contact switches being located on said other lateral side so as to correspond to the respective positions of the middle finger and the ring finger.

7. The one-hand control unit of claim 6, wherein a third momentary-contact switch is mounted on said other one of said lateral sides and is located thereon to correspond to the position of the little finger.

8. The one-hand control unit of claim 4, said body having a forward side lying essentially perpendicular to said first and second lateral sides; and, said control unit further comprising an additional momentary-contact switch mounted on said forward side.

9. A microscope arrangement comprising:

a microscope having a plurality of motor movable elements; and, a one-hand control unit which is placed on and moved over a support surface to control said motor movable elements in said microscope;

the one-hand control unit including:

a body which can be manually grasped by an operator;

said body having a lower side for placing said control unit on the support surface and for guiding said control unit thereover;

said body having two lateral sides lying opposite each other;

a rotational transducer mounted in one of said lateral sides for detecting one or two dimensional movement;

said control unit including a plurality of momentary-contact switches mounted-in the other one of said lateral sides;

a first one of said movable elements being an objective-lens turret; and, a first one of said momentary-contact switches being provided to effect a counter-clockwise rotation of said turret and a second one of said momentary-contact switches being provided to effect a clockwise rotation of said turret.

10. The microscope arrangement of claim 9, wherein a second one of said movable elements is a reflector turret; and, wherein a third one of said switches is adapted to effect a switchover of the association of said first switch between said objective-lens turret and said reflector turret and to effect a switchover of the association of said second switch between said objective-lens turret and said reflector turret.

11. The microscope arrangement of claim 9, wherein: said microscope includes an illuminating field diaphragm defining an opening which can be varied and an aperture diaphragm of a transilluminating light beam path likewise defining an opening which can be varied; each of said diaphragms being equipped with a motor to adjust the opening thereof; and, wherein: said control unit includes an element mounted in said lower side for detecting a two-dimensional movement of said control unit on said support surface and said element being adapted to vary the opening of one of said diaphragms; and, said rotational transducer being adapted to vary the opening of the other one of said diaphragms.

12. The microscope arrangement of claim 9, wherein said microscope includes a motorized focus drive and said rotational transducer being adapted to drive said motorized focus drive.

13. The microscope arrangement of claim 12, wherein said motorized focus drive includes a gear reduction; and, wherein said at least one switch is adapted to control said gear reduction of said motorized focus drive.

14. The microscope arrangement of claim 9, wherein said control unit includes an element mounted in said lower side for detecting a two-dimensional movement of said control unit on said support surface; and, said microscope arrangement further comprising a computer and a computer monitor on which a cursor can be displayed; and, said one switch being adapted to effect a switchover of the association of said element between one of said motor movable elements and said cursor.

15. The microscope arrangement of claim 9, wherein: said microscope includes an illuminating field diaphragm defining an opening which can be varied and an aperture diaphragm of a transilluminating light beam path likewise defining an opening which can be varied; each of said diaphragms being equipped with a motor to adjust the opening thereof; and, wherein: said control unit includes an element mounted in said lower side for detecting a two-dimensional movement of said control unit on said support surface and said element being adapted to vary the opening of one of said diaphragms; and, said rotational transducer being adapted to vary the opening of the other one of said diaphragms.

16. The microscope arrangement of claim 9, wherein said microscope includes a motorized focus drive and said rotational transducer is adapted to drive said motorized focus drive.

17. A microscope arrangement comprising:
a microscope having a plurality of motor movable elements; and,
a one-hand control unit which is placed on and moved over a support surface to control said motor movable elements in said microscope;
the one-hand control unit including:
a body which can be manually grasped by an operator;
said body having a lower side for placing said control unit on the support surface and for guiding said control unit thereover;
said body having two lateral sides lying opposite each other;
a rotational transducer mounted in one of said lateral sides for detecting one or two dimensional movement;
said control unit including a plurality of momentary-contact switches mounted in the other one of said lateral sides;
a first one of said movable elements being an objective-lens turret;
a first one of said switches being provided to effect a counter-clockwise rotation of said turret and a second one of said switches being provided to effect a clockwise rotation of said turret;
a second one of said movable elements being a reflector turret; and,
a third one of said switches being adapted to effect a switchover of the association of said first switch between said objective-lens turret and said reflector turret and to effect a switchover of the association of said second switch between said objective-lens turret and said reflector turret.

18. The microscope arrangement of claim 17, wherein: said microscope includes an illuminating field diaphragm defining an opening which can be varied and an aperture diaphragm of a transilluminating light beam path likewise defining an opening which can be varied; each of said diaphragms being equipped with a motor to adjust the opening thereof; and, wherein: said control unit further includes an element mounted in said lower side for detecting a two-dimensional movement of said control unit on said support surface and said element being adapted to vary the opening of one of said diaphragms; and, said rotational transducer being adapted to vary the opening of the other one of said diaphragms.

19. The microscope arrangement of claim 17, wherein said microscope includes a motorized focus drive and said rotational transducer is adapted to drive said motorized focus drive.

20. A microscope arrangement comprising:
a microscope having a plurality of motor movable elements; and,
a one-hand control unit which is placed on and moved over a support surface to control said motor movable elements in said microscope;
the one-hand control unit including:
a body which can be manually grasped by an operator;
said body having a lower side for placing said control unit on the support surface and for guiding said control unit thereover;
said body having two lateral sides lying opposite each other;
a rotational transducer mounted in one of said lateral sides for detecting one or two dimensional movement;
at least one momentary-contact switch mounted in the other one of said lateral sides;
said microscope including a motorized focus drive and said rotational transducer being adapted to drive said motorized focus drive;
said motorized focus drive including a gear reduction; and,
said at least one switch being adapted to control said gear reduction of said motorized focus drive.

21. A microscope arrangement comprising:
a microscope having a plurality of motor movable elements; and,
a one-hand control unit which is placed on and moved over a support surface to control said motor movable elements in said microscope;
the one-hand control unit including:
a body which can be manually grasped by an operator;
said body having a lower side for placing said control unit on the support surface and for guiding said control unit thereover;
said body having two lateral sides lying opposite each other;
a rotational transducer mounted in one of said lateral sides for detecting one or two dimensional movement;
at least one momentary-contact switch mounted in the other one of said lateral sides; and,
said control unit including an element mounted in said lower side for detecting a two-dimensional movement of said control unit on said support surface;
a computer and a computer monitor on which a cursor can be displayed; and,
said one switch being adapted to effect a switchover of the association of said element between one of said motor movable elements and said cursor.

22. The microscope arrangement of claim 20, wherein: said microscope includes an illuminating field diaphragm defining an opening which can be varied and an aperture diaphragm of a transilluminating light beam path likewise defining an opening which can be varied; each of said diaphragms being equipped with a motor to adjust the opening thereof; and, wherein: said control unit includes an element mounted in said lower side for detecting a two-dimensional movement of said control unit on said support surface and said element being adapted to vary the opening of one of said diaphragms; and, said rotational transducer being adapted to vary the opening of the other one of said diaphragms.

23. The microscope arrangement of claim 20, further comprising:

an object stage assembly including an object stage; a first motor for effecting a movement of said object stage in a first direction and a second motor for effecting a movement of said object stage in a second direction perpendicular to said first direction; and, said one-hand control unit further including an element mounted in said lower side for detecting a two-dimensional movement of said control unit on said support surface and said element being adapted to drive skid first and second motors of said object stage assembly.

24. The microscope arrangement of claim 21, wherein said microscope includes a motorized focus drive and said rotational transducer being adapted to drive said motorized focus drive.

25. The microscope arrangement of claim 24, wherein said motorized focus drive includes a gear reduction; and, wherein said at least one switch is adapted to control said gear reduction of said motorized focus drive.

26. The microscope arrangement of claim 21 wherein one of said motor movable elements is an object stage assembly including an object stage; a first motor for effecting a movement of said object stage in a first direction and a second motor for effecting a movement of said object stage in a second direction perpendicular to said first direction; and, said switch is adapted to effect a switchover of the association of said element between said object stage assembly and said cursor.

* * * * *

UNITED STATES PATENT AND TRADEMARK OFFICE
CERTIFICATE OF CORRECTION

PATENT NO. : 5,712,725
DATED : January 27, 1998
INVENTOR(S) : Bernd Faltermeier, et al.

It is certified that error appears in the above-identified patent and that said Letters Patent is hereby corrected as shown below:

On the title page, under [75]: delete "Ferninand" and substitute -- Ferdinand -- therefor.

On the title page, under [56], second column: delete "61-27019" and substitute -- 61-270719 -- therefor.

In column 7, line 18: delete "unit, on" and substitute -- unit on -- therefor.

In column 8, line 35: delete "mounted-in" and substitute -- mounted in -- therefor.

In column 12, line 2: delete "skid" and substitute -- said -- therefor.

In column 12, line 13: between "21" and "wherein", insert -- , --.

Signed and Sealed this

Twenty-first Day of April, 1998

Attest:

BRUCE LEHMAN

*Attesting Officer*  *Commissioner of Patents and Trademarks*